(12) United States Patent
Bhat

(10) Patent No.: US 6,677,961 B1
(45) Date of Patent: Jan. 13, 2004

(54) METHOD AND APPARATUS FOR IDENTIFYING A PREDETERMINED NUMBER OF REPRESENTATIVE DATA PIECES FROM WITHIN A SELECTED DATA SEGMENT

(75) Inventor: Dinkar N. Bhat, Monmouth Junction, NJ (US)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/404,304

(22) Filed: Sep. 24, 1999

(51) Int. Cl.[7] ............................................... G09G 5/00
(52) U.S. Cl. ........................................ 345/723; 345/853
(58) Field of Search ................................ 345/723, 853, 345/854, 716, 719, 720, 724, 725, 726

(56) References Cited

U.S. PATENT DOCUMENTS

| | | | | |
|---|---|---|---|---|
| 5,821,945 A | * | 10/1998 | Yeo et al. ................ 345/440 |
| 5,956,026 A | * | 9/1999 | Ratakonda ................ 345/723 |
| 6,172,675 B1 | * | 1/2001 | Ahmad et al. ............. 345/723 |
| 6,342,904 B1 | * | 1/2002 | Vasudevan et al. ........ 345/716 |
| 6,526,215 B2 | * | 2/2003 | Hirai et al. ................. 386/52 |
| 6,535,639 B1 | * | 3/2003 | Uchihachi et al. .......... 382/225 |

* cited by examiner

Primary Examiner—Kristine Kincaid
Assistant Examiner—Thanh Vu
(74) Attorney, Agent, or Firm—Birch, Stewart, Kolasch & Birch, LLP

(57) ABSTRACT

A method and apparatus identifies a predetermined number of representative data pieces from within a selected data segment, regardless of the size of the selected data segment. These start and end points of the selected data segment may be changed to modify the origin and duration of the selected data segment. Thus, the predetermined number of representative data pieces represents the selected data segment with varied resolution. Generally, this apparatus and method is applied to stored or live video data.

21 Claims, 5 Drawing Sheets

METHOD AND APPARATUS FOR IDENTIFYING A PREDETERMINED NUMBER OF REPRESENTATIVE DATA PIECES FROM WITHIN A SELECTED DATA SEGMENT

BACKGROUND OF THE INVENTION

1. Field of the Invention

The present invention relates to a method and apparatus for identifying a predetermined number of representative data pieces from within a selected data segment. More particularly, the present invention relates to a method and apparatus for identifying a predetermined number of representative video images from within a selected video segment by comparing the video images of the selected video segment.

2. Description of the Related Art

Conventional televisions sets include a screen upon which images are formed for viewing. Typically, displayed on the screen is a single window corresponding to a single program. A picture-in-picture (PIP) feature is also generally available to enable a second window of reduced size for viewing a second program simultaneously with the first program viewed on the first window. However, the number of windows available on a conventional television has been limited to two (2), distinguishing conventional television sets from personal computer monitors that enable a number of windows limited only by the memory capacity of the personal computer.

Recently, with the advent of storage mediums capable of storing multiple data items (e.g., audio and video items) it has become desirable to summarize the contents of storage mediums. One method of providing such summary information involves storing a table of contents on the storage medium, and reproducing the table of contents for a user accessing the storage medium. By storing the table of contents on the storage medium, this method necessarily reduces the available storage capacity of the storage medium by the size of the table of contents stored thereon.

An alternative method for providing summary information involves identifying stored data pieces that represent and/or summarize the storage device contents based on random subsampling techniques. For example, a conventional technique for building a summary of digital video frames involves random or periodic subsampling the digital video frames of a storage device without regard for their video content. Specifically, this method involves identifying and extracting a first set of data pieces within a video, iteratively identifying and extracting additional sets of data pieces from within previous sets of data pieces until a fixed ratio of compression (e.g., 50%) is achieved, and providing the user with the final set of data pieces ultimately extracted. Because the number of data pieces required to achieve a fixed ratio of compression necessarily increase with the size of the video segment being summarized, the resulting number of data pieces identified for display may not be suitable for conventional television systems as described above.

Yet another alternative approach for providing summary information involves detecting transitions within the storage device contents, and displaying data items at the detected transitions to represent the contents of the storage medium. However, this approach involves identifying and displaying a variable number of data items, the number of data items identified depending upon the number of transitions detected in the storage device contents. Because the number of data pieces increase with an increased number of detected transitions within the storage device contents, the number of data pieces identified for display by this method may also be non-suitable for conventional television systems as described above.

SUMMARY OF THE INVENTION

The present invention is directed to an apparatus and method that substantially obviates one or more of the problems experienced due to the above and other limitations and disadvantages of the conventional art.

An object of the present invention is to identify a predetermined and fixed number of representative video frames capable of abstracting a selected video segment, regardless of the size of the video segment being abstracted. If several levels of video frames are required corresponding to different levels of abstraction, the number of frames on each level may be fixed to a predetermined but different number.

Another object of the present invention is to provide a method and apparatus for identifying representative video images for selected segments of a video, which may involve identifying and moving a start and end point of the video segment being summarized.

Yet another object of the present invention is to provide a method and apparatus for identifying a fixed and predetermined number of representative images that abstract a selected video segment, thereby achieving a representation whose resolution varies depending upon the size of the video segment being represented. For instance, if a predetermined number of video images are identified to abstract a relatively small video segment, and the same predetermined number of video images are used to represent a relatively large video segment, the resolution provided by the representative video images of the respective abstracts will vary.

Another object of the present invention is to provide a method and apparatus capable of identifying representative data pieces for stored data and/or live data. For instance, the present invention may be used to identify representative video images from a video segment or program stored on a recording medium, or alternatively may be used to identify representative video images from a live video stream.

Other and further objects, features and advantages of the present invention will be set forth in the description that follows, and in part will become apparent from the detailed description, or may be learned by practice of the invention.

It is to be understood that both the foregoing general description and the following detailed description are exemplary and explanatory and are intended to provide further explanation of the invention as claimed. Thus, it should be understood that the detailed description and specific examples, while indicating preferred embodiments of the invention, are given by way of example only. Various changes and modifications that are within the spirit and scope of the invention will become apparent to those skilled in the art from this detailed description. In fact, other objects, features and characteristics of the present invention; methods, operations, and functions of the related elements of the structure; combinations of parts; and economies of manufacture will surely become apparent from the following detailed description of the preferred embodiments and accompanying drawings, all of which form a part of this specification, wherein like reference numerals designate corresponding parts in various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1A:
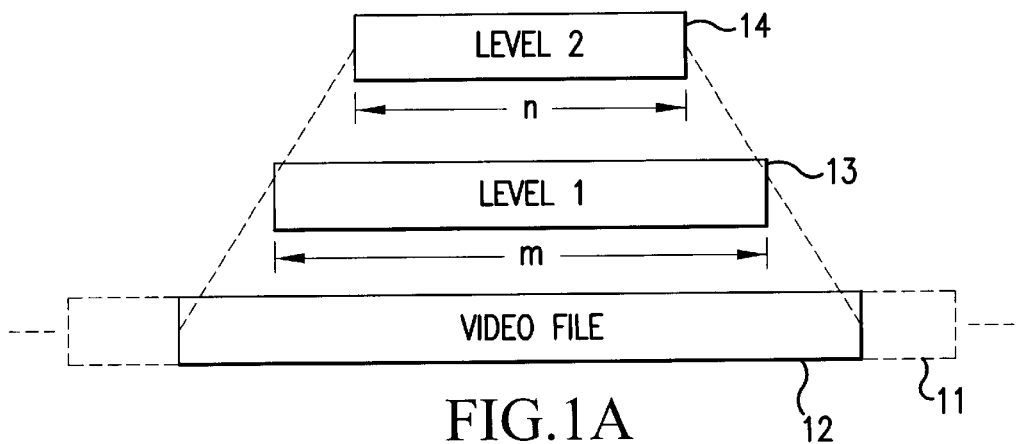
FIG. 1A is a block diagram illustrating the results of a process performed in accordance with a preferred embodiment of the present invention.

Detailed reference will now be made to the preferred embodiments of the present invention, examples of which are illustrated in the accompanying drawings. In the drawings, redundant description of like elements and processes, which are designated with like reference numerals, is omitted for brevity.

FIG. 1A is a block diagram illustrating the results of a process performed in accordance with a preferred embodiment of the present invention. FIG. 1A includes a video file 11 containing a video segment 12, a first level 13 and a second level 14. Video segment 12 is a selected portion of video file 11 having fewer video images than video file 11. The number of video images is preferably fixed at a predetermined number in each of first level 13 and second level 14. For instance, FIG. 1A shows first level 13 having m video images and second level 14 having n video images, the number of video images in video segment 12 being greater than the number of video images in first level 13, and the number of video images in first level 13 being greater than the number of video images in second level 14. Thus, FIG. 1A illustrates the identification of at least one level containing a fixed and predetermined number of representative video images used to abstract a selected video segment.

Figure 1B:
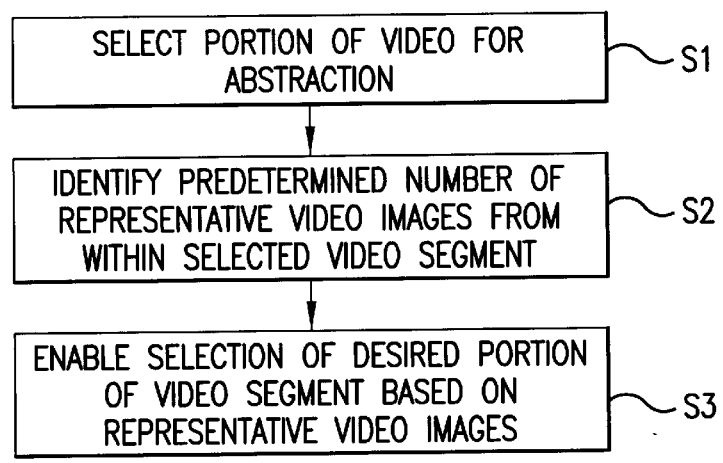
FIG. 1B is a flow chart illustrating an example of the process performed in accordance with the preferred embodiment of the present invention, which achieves results such as those shown in FIG. 1A.

FIG. 1B is a flow chart illustrating an example of the process performed in accordance with the preferred embodiment of the present invention, which achieves results such as those shown in FIG. 1A. FIG. 1B includes three (3) steps: step S1 in which a portion of a video is selected for abstraction, step S2 in which at least one predetermined number of representative video images is identified from within the selected video segment to abstract the selected video segment, and step S3 in which a selection of a desired portion of the video segment is enabled based on the representative video images identified in step S2. Each of the three steps shown in FIG. 1B is described below with more particularity.

In step S1, a viewer selects a video segment from within a video for abstraction. For instance, an example of step S1 is described in greater detail in FIG. 1A which shows the selection of a video segment 12 for abstraction from within an entire video 11 that is recorded on a storage medium (e.g., VCR tape, DVD disk, etc.). As described with respect to FIG. 1A, video segment 12 generally includes fewer video images than video file 11. However, it is possible to select an entire video file for representation in step S1. The selection of video segment 12 may be performed manually in response to a prompt, or may be performed automatically by a reproducing device based on predesignated criteria such as the presence or absence of a viewer.

In step S2, at least one predetermined number of representative video images is identified to abstract the selected video segment 12. The identification performed in step S2 is shown generally by FIG. 1A, where first level 13 illustrates a first predetermined number m of representative video images from within the selected video segment 12 that are identified to abstract the selected video segment 12, and second level 14 illustrates a second predetermined number n of representative video images from within the first level 13 that are identified to abstract first level 13.

Figure 2A:
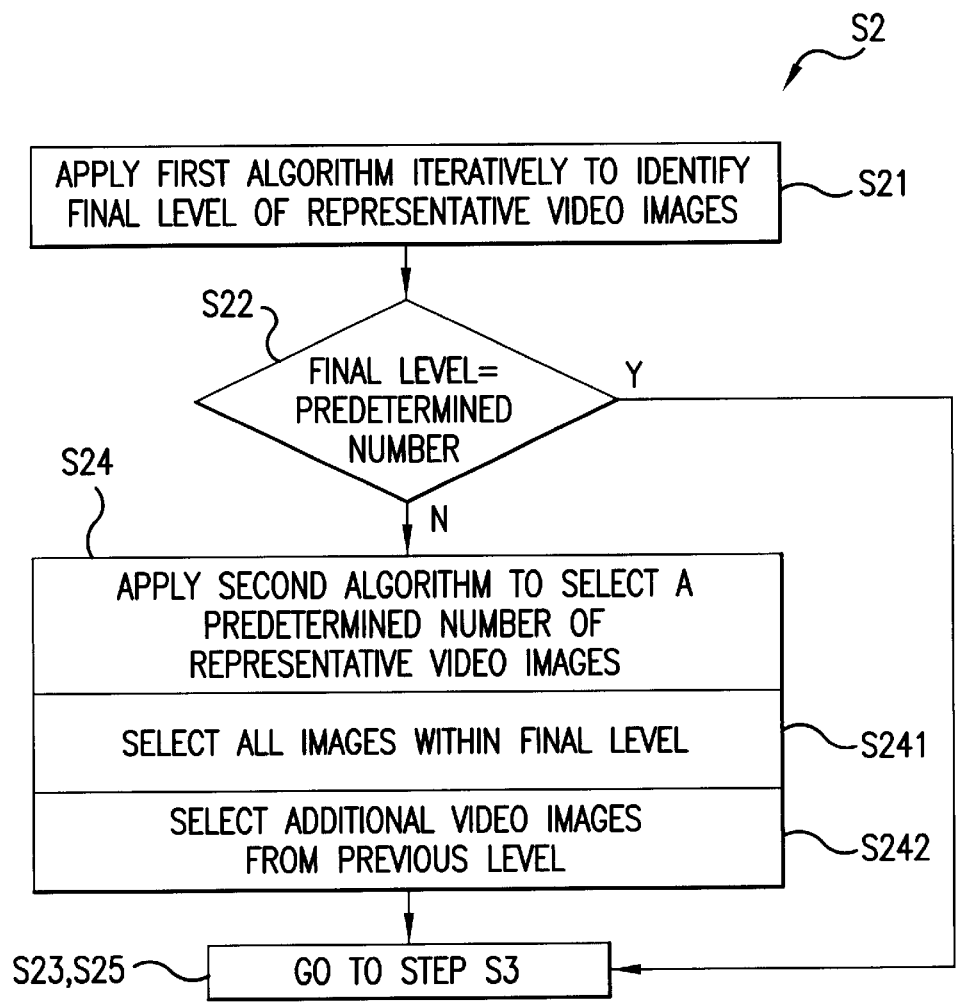
FIG. 2A is a flow chart illustrating the method performed in step S2 of FIG. 1B.
Figure 2B:
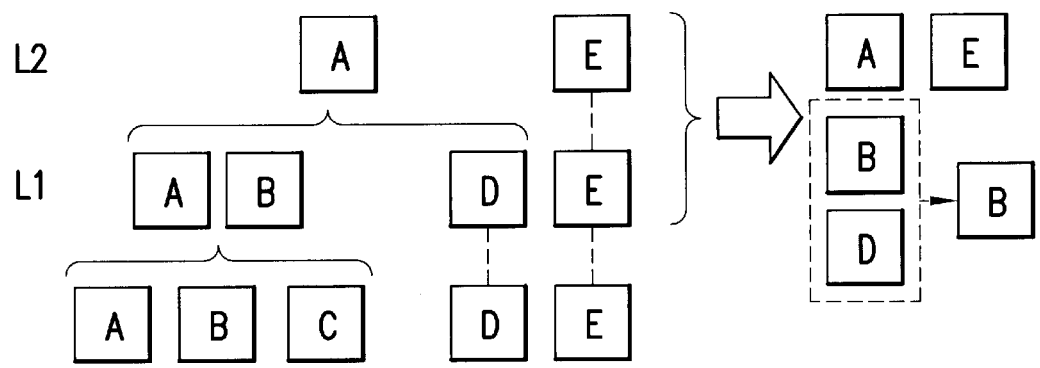
FIG. 2B illustrates several levels of video images that illustrate the process of reducing the number of video images in a selected video segment to predetermined number of video images.

Step S2 is described in greater detail in FIGS. 2A and 2B. Specifically, FIG. 2A is a flow chart illustrating the method performed in step S2 of FIG. 1B. In this process, a first algorithm is iteratively performed to identify a final level of representative video images for abstraction, the final level having a number of images that is equal to or less than a predetermined number (step S21). Preferably, the levels of representative video images each have a predetermined number of video images, as illustrated by FIG. 1A. However, the number of video images within any given level may not be the predetermined number of representative video images desired. If no level includes the predetermined number of representation video images desired, a second algorithm can be performed in accordance with step S24 to identify that predetermined number of representative video images from adjacent levels containing a number of video images greater and lesser than the predetermined number.

That is, if the number of representative video images in the final level is equal to the predetermined number (step S22), the process returns to step S3 of FIG. 1B to enable selection of a desired portion of the video segment based on the representative video images identified (Step S23). However, if the number of representative video images in the final level is less than the predetermined number (step S22), a second algorithm is applied to select the predetermined number of representative video images from the final level and the level preceding the final level (Step S24). Once the second algorithm is performed to select the predetermined number of representative video images, the process is forwarded to step S3 of FIG. 1B to enable selection of a desired portion of the video segment based on the representative video images (step S25).

As shown in FIG. 2A, step S24 involves selection of all video images from within the final level identified in step S21 (Step S241) since that level includes less than the predetermined number of video images. In addition, step S24 involves selection of a number of video images from within the level preceding the final level, the number of video images being selected from the preceding level being equal to a difference between the number of images in the final level and the predetermined number (step S242).

FIG. 2B shows several levels of video images in order to illustrate the process of reducing the number of video images in a selected video segment to a predetermined number of video images, as described above with respect to step S24 of FIG. 2A. As illustrated in FIG. 2B, the selected video segment includes five (5) video images, video image A through video image E. From the five video images within the selected video segment, four (4) video images are identified by applying a first algorithm, namely video images A, B, D, and E within level L1. Because the number of video images within level L1, namely four (4), is neither equal to nor less than the predetermined number, namely three (3), a second iteration of the first algorithm must be performed in step S21 to identify the final level of representative video images. Therefore, the first algorithm is re-applied to identify a second level of two (2) video images from among the four (4) video images within the first level L1, thereby identifying video image A and video image E. Because the number of video images within level L2 is less than the predetermined number of video images to be included in the final level, process proceeds to step S24 by virtue of the comparison made in step S22.

In step S24, the predetermined number of representative video images are selected from among the final level L2 and the level L1 that preceded the final level L2. The two processes performed in step S24 are illustrated by the portion of FIG. 2B shown adjacent the right arrow therein. First, in accordance with step S241, the video images within the final level L2 are selected as representative video images, namely video images A and E. However, since the final level L2 includes only two (2) video images, there exists a deficiency of one (1) video image between the number of images in the final level (e.g., 2) and the predetermined number of representative video images sought (e.g., 3). Consequently, in accordance with step S242, the single deficient video image must be selected from among the remaining video images within level L1 that precedes final level L2. For instance, in the example of FIG. 2B, video images B and D must be compared to yield a final representative video image, e.g., video image B in FIG. 2B. Ultimately, at the conclusion of S24, the requisite predetermined number of representative video images are identified in accordance with step S2, namely the three (3) video images A, B and E.

Various algorithms are well known for comparing multiple video images to identify levels of similarity between those video images, and to select images with a certain degree of similarity or dissimilarity from the comparison. The first and second algorithms described above with respect to steps S21 and S24 employ these well-known concepts. Specifically, the first and second algorithms applied in steps S21 and S24 may or may not vary. Either or both may be based on, e.g., a comparison of a predetermined or moving average threshold to difference in color characterization or texture within two or more video images. In the example shown by FIG. 2B, the first algorithm is based on a grouping of video images within the selected video segment and comparisons of the video images within those groupings. Although FIG. 2B shows groups of three (3) video images being compared, the number of video images grouped for comparison may be a number greater than three.

Various criteria are well known as a basis for comparing video images within a selected video segment, as required in step S2 discussed above, e.g., differences in color characterization and texture. For instance, if texture is used for comparison, the first algorithm identifies at least one video image for each set of at least three (3) neighboring video image frames by comparing the difference in texture between those neighboring frames to one or more thresholds. For instance, when more than one threshold is used, only one of the three (3) video images is included on the next level when the texture differences exceed a first relatively small threshold value, perhaps as a representative video image. However, it is possible to include two or more of the three video images being compared on the next level when texture differences exceed a second relatively higher threshold, perhaps as representative video images. Alternatively, if a single threshold is used, texture differences among pairs of video images within each group of three or more images may be compared with the threshold to determine which of the three video images to include in the next level. In this regard, a threshold profile can be fixed or adaptive to provide threshold values capable of discriminating a limited set of video images that are fewer than the video images being compared.

Similarly, the second algorithm may group some of all of the remaining video images from a level (e.g., level L1 of FIG. 2B) that precedes the final level (e.g., second level L2 of FIG. 2B), and apply a threshold to select the number of video images corresponding to the deficiency between the number of representative video images. That is, if a single video image is desired from within a level preceding the final level, an appropriate threshole is applied to yield a single video image, as illustrated by FIG. 2B In step S3, the representative video images identified in step S2 are provided to enable selection of a desired portion of the video segment. Generally, the representative video images identified in step S2 are displayed on a viewing device such as a television screen, based upon which a viewer selects a desired portion of the video segment to be viewed. The viewer typically uses a controller to make this selection, some examples of which include a hand-held remote control unit, a touch-screen pad and a voice-activated control module. In response to this selection, the desired portion of the video segment is displayed for the user.

The above process may be automatically invoked by loading a storage device into a playback machine, by powering-up a playback machine, or by some manual user control. In addition, these processes may be automatically invoked based on program codes embedded into the program being reproduced, e.g., a program having multiple alternative endings may have an embedded code that automatically enables selection among the alternative outcomes at a point of divergence within the program.

The representative video images identified in the above-described processes correspond to the video segment selected in step S1. However, the comparisons made in step S2 can be re-used to identify representative video images in different video segments of larger or smaller size if those different video segments include some or all of the video images in the original video segment. This process involves applying the first and/or second algorithms of step S2 to any newly added video images and any existing video images that were previously compared with now-excluded video images. Otherwise, duplicative comparisons are avoided by referring to the results of the first and second algorithms previously performed.

Figure 3:
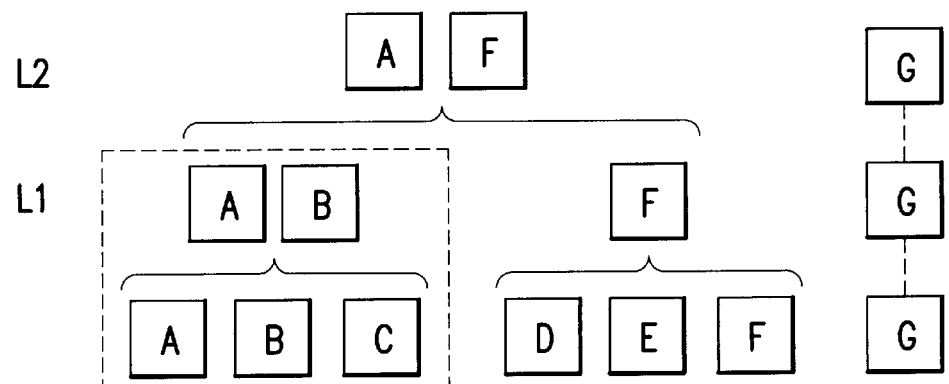
FIG. 3 illustrates a set of video images that are subject to the processes performed by the preferred embodiment of the present invention.

For instance, FIG. 3 illustrates a set of video images that are subject to the processes performed by the preferred embodiment of the present invention. The video segment selected in FIG. 3 has seven (7) video images, namely video images A–G. This video segment therefore includes the same five (5) video images used for comparison in the example shown in FIG. 2B, namely video images A–E. That is, in FIG. 3, the video segment of FIG. 2B is expanded to include new video images F and G. Rather than performing the first algorithm of step S21 anew for each of the seven (7) video images, the present invention of avoids duplicative computation by referring to the comparisons performed previously with regard to the video segment that includes video images A–E.

In particular, the comparison of video images A–C was performed for the video segment shown above in the FIG. 2B example, yielding video images A and B in the first level of L1. Rather than repeating that comparison, the results are copied for the segment shown in FIG. 3. Otherwise, since newly added video image F must be compared with video images D and E in the FIG. 3 example, the computations regarding video images D and E previously performed in the FIG. 2B example cannot be re-used. Therefore, other than the comparison of video images A–C, the video segment of FIG. 3 requires step S2 to be performed in accordance with the process shown by FIG. 2A.

Figure 4A:
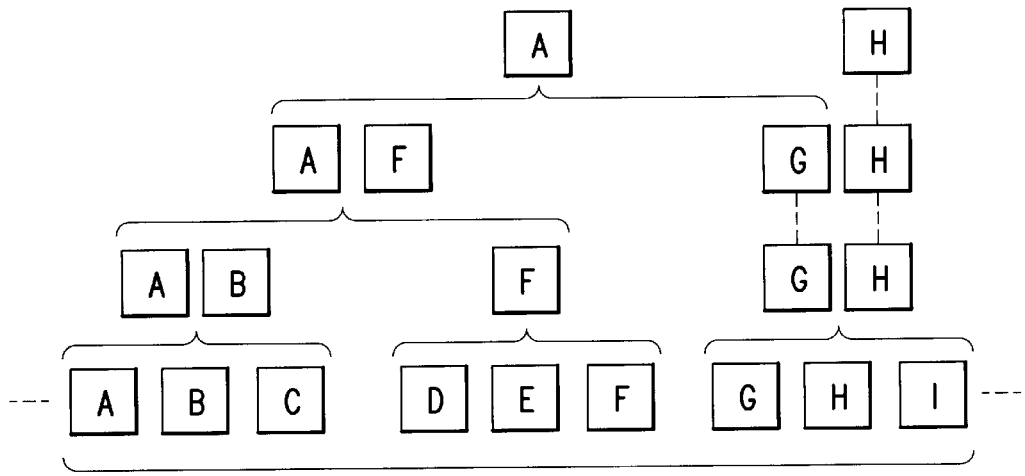
FIGS. 4A and 4B illustrate the selection and computation performed in accordance with a preferred embodiment of the present invention based on a relatively large first video segment (see FIG. 4A) and a subsequent selection and computation based on a relatively small second video segment (see FIG. 4B)
Figure 4B:
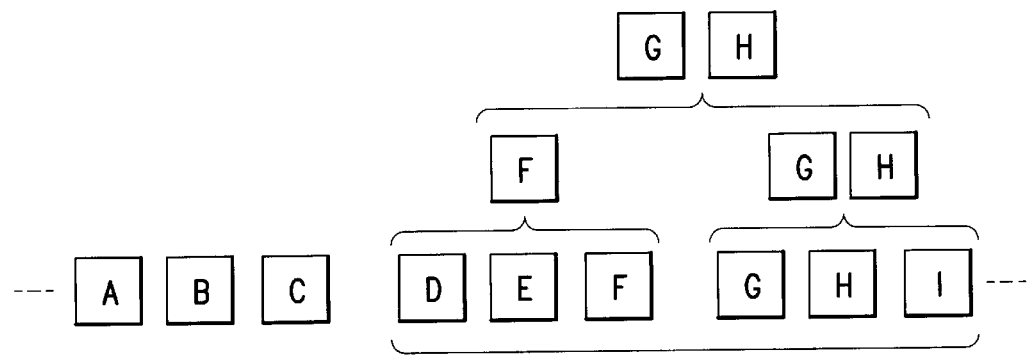

Similarly, relevant sections of a previously selected segment of a video can be referenced to save computation time when smaller portions of the video are selected for abstraction via identification of representative video images. Again, portions of the newly selected video segment that are outside the previously selected video segment must be recomputed to account for the influence of the newly added portion of the video. FIGS. 4A and 4B illustrate the selection and computation based on a relatively large first video segment (see FIG. 4A) and a subsequent selection and computation based on a relatively small second video segment (see FIG. 4B). As illustrated, the computations required to identify representative video images within the video segment selected in FIG. 4B are somewhat redundant of the computations performed to identify representative video images for the video segment selected in FIG. 4A. Thus, the results of the procedures performed with respect to FIG. 4A can be copied to avoid duplication of effort when performing the same procedures with respect to the selected portion shown in FIG. 4B.

Figure 5:
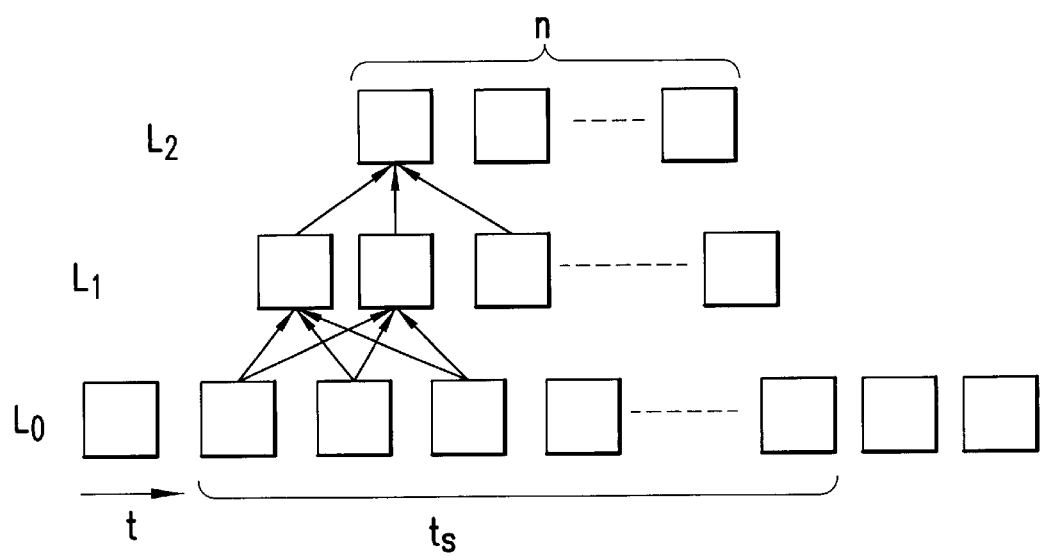
FIG. 5 illustrates the process performed by a preferred embodiment of the present invention on a live video feed.

The above description involves identification of representative video images from stored video segments, but can be easily adapted to identify representative video images to abstract a live video feed. For instance, as shown by FIG. 5, a live video feed is received at level L0. A portion of the live video feed initially selected includes the video frames designated ts. The above-described procedures can be performed with respect to this initially selected video segment to identify representative video images therein. Thereafter, as the live video feed progresses, the selected video segment may be manually or automatically shifted in time to include different groupings of video images with the live video feed, and the above-described processes may be performed to identify representative video images for abstracting any currently selected video segment, thereby avoiding redundant operations by referencing earlier performed comparisons between video images within the currently selected video segment, as described with respect to FIGS. 3A–4B.

Although the above description focuses primarily on summarizing digital video, it can be readily applied to summarize other forms of data such as pixel data and different forms of multimedia data. For instance, this invention can be used to summarize audio data as well as to summarize analog data, audio data, and video data that has been digitized.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. A method of identifying a predetermined number of representative data pieces from within a selected data segment, the method comprising:
    selecting a data segment to be summarized, the selected data segment constituting a base level; and
    identifying a predetermined number of representative data pieces from within the selected data segment, the identifying including,
        establishing at least one level of representative data pieces from the selected data segment, and
        compensating a number of representative data pieces present in the highest level of said at least one level with at least one representative data piece from a level lower than the highest level if said number of representative data pieces present in the highest level is less than said predetermined number.

2. The method of claim 1, wherein the identifying comprises:
    comparing data pieces of the selected data segment based on content.

3. The method of claim 1, wherein the selecting involves selecting a video segment from within a video, and wherein the identifying involves identifying a predetermined number of representative video images from within the video segment such that the data being summarized includes video data, the data segment includes several video images of the video data, and the representative data pieces include video images within the data segment.

4. The method of claim 3, wherein the identifying comprises:
    comparing video images of the selected video segment based on content.

5. The method of claim 1, wherein the selecting comprises:
    selecting the data segment to be summarized from less than all available data.

6. The method of claim 1, wherein the predetermined number of representative data pieces remains constant regardless of the amount of video represented by the data segment to be summarized.

7. The method of claim 1, wherein, in the identifying, said at least one level of representative data pieces includes a plurality of levels of representative data pieces from within the selected data segment, a first of the levels including representative data pieces derived directly from the selected data segment, each of the other levels including representative data pieces derived directly from a previous level of representative data pieces.

8. The method of claim 7, wherein, in the identifying, at least some of the representative data pieces in one of the levels were obtained without comparison by copying certain previously determined representative data pieces.

9. The method of claim 1, wherein the establishing comprises:
identifying more than one set of representative data pieces from within the selected data segment, each identified set of representative data pieces corresponding to a different level of detail and having a different number of representative data pieces.

10. The method of claim 1, further comprising:
locating desired portions of video for viewing based on the identified representative data pieces.

11. The method of claim 1, wherein, in the compensating, said level lower than the highest level is the base level.

12. A method for enabling selection of a desired portion of a video segment based on a predetermined number of images representing the video segment, the method comprising:
identifying a predetermined number of representative video images from a video segment, the identifying including,
establishing at least one level of representative data pieces from the selected data segment, and
compensating a number of representative data pieces present in the highest level of said at least one level with at least one representative data piece from a level lower than the highest level if said number of representative data pieces present in the highest level is less than the predetermined number, the predetermined number remaining constant regardless of the size of the video segment being summarized; and
enabling selection of the desired portion of the video segment to be viewed based on at least one of the representative video images.

13. The method of claim 12, wherein the enabling comprises:
displaying the representative video images; and
receiving input indicating selection of a displayed representative video image,
wherein the input indicates the selection of the desired portion of the video segment to be viewed.

14. The method of claim 12, wherein the identifying comprises:
selecting the video segment to be summarized from within an entire video; and
identifying the predetermined number of representative video images from within the selected video segment.

15. The method of claim 14, wherein the selecting involves selecting a video segment that includes less than all of the entire video from which the selection is made.

16. The method of claim 14, wherein, in the identifying, said at least one level of representative data pieces includes a plurality of levels of representative video images from within the selected video segment, a first of the levels including representative video images derived directly from the selected video segment, each of the other levels including representative video images derived directly from a previous level of representative video images.

17. The method of claim 16, wherein, in the identifying, at least some of the representative data pieces in one of the levels were obtained without comparison by copying certain previously determined representative data pieces.

18. The method of claim 14, wherein the establishing comprises:
identifying multiple sets of representative video images, each having different numbers of representative video images.

19. The method of claim 14, wherein the establishing comprises:
identifying more than one set of representative video images from within the selected video segment, each of the additional sets having a different number of representative video images.

20. The method of claim 13, further comprising:
locating desired portions of the video segment for viewing based on the identified representative video images.

21. The method of claim 14, wherein, in the compensating, said level lowered than the highest level is a base level which is constituted by the selected video segment.

* * * * *